US006661629B2

(12) United States Patent
Murtishaw et al.

(10) Patent No.: US 6,661,629 B2
(45) Date of Patent: Dec. 9, 2003

(54) METHOD AND DEVICE FOR PREVENTING ARCING BETWEEN A HIGH-VOLTAGE EXTERNAL PROBE TIP AND A FRIT GROUNDING BAND DURING FRIT KNOCKING

(75) Inventors: David Allen Murtishaw, Sun City, CA (US); Brian Michael Solomich, Vista, CA (US); Edward Martinez, Vista, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 354 days.

(21) Appl. No.: 09/839,281

(22) Filed: Apr. 20, 2001

(65) Prior Publication Data

US 2002/0154460 A1 Oct. 24, 2002

(51) Int. Cl.[7] .......... H02H 3/00
(52) U.S. Cl. .......... 361/42; 361/56; 324/404
(58) Field of Search .......... 361/3, 42, 11, 361/56, 1, 2; 315/3; 324/404, 474

(56) References Cited

U.S. PATENT DOCUMENTS 3,742,247 A * 6/1973 Sunstein .......... 361/1
3,943,438 A * 3/1976 Barber et al. .......... 324/404

* cited by examiner

*Primary Examiner*—Brian Sircus
*Assistant Examiner*—James Demakis
(74) *Attorney, Agent, or Firm*—Steven L. Nichols

(57) ABSTRACT

An insulating member is used on or with a high-voltage probe that applies a voltage to the anode of a cathode ray tube during manufacture of the tube. If there are flaws in the frit seal of the tube, the probe produces arcing through the flaw into a grounded, conductive band disposed around the exterior of the frit seal. The insulating member is placed between the high-voltage probe tip and the grounded band around the frit seal. Consequently, the insulating member prevents electrical arcing external to the cathode ray tube between the high-voltage probe and the grounded band. Such arcing would otherwise interfere with the testing of the frit seal and could possibly damage the test equipment.

20 Claims, 5 Drawing Sheets

METHOD AND DEVICE FOR PREVENTING ARCING BETWEEN A HIGH-VOLTAGE EXTERNAL PROBE TIP AND A FRIT GROUNDING BAND DURING FRIT KNOCKING

FIELD OF THE INVENTION

The present invention relates to the field of cathode ray tube manufacture, particularly frit knocking. More specifically, the present invention relates to a device and method for preventing arcing during an evaluation of the frit seal in a cathode ray tube using an external high-voltage probe. The present invention provides an insulating member placed on or adjacent to the high voltage probe tip, between the probe tip and the grounding band on the frit seal, that prevents arcing.

BACKGROUND OF THE INVENTION

Cathode ray tubes ("CRTs") are well known in modern society. The CRT is the principal component in such common devices as television sets and computer and video monitors. As shown in FIG. 1, a CRT (100) typically includes a relatively flat display portion (101) (upper portion as seen in FIG. 1). When one is watching television or looking at a computer monitor, that person is looking at the flat display portion (101) of a cathode ray tube. Below the display portion (101) is a funnel portion (102) that narrows into the "neck" of the CRT.

During manufacture, an electro-luminescent material such as phosphorus is coated over the display portion (101) of the CRT. The display portion (101) is then joined to the funnel (102) using a glass paste compound known as frit. A bead of frit is distributed around the interface between the funnel (102) and the display portion (101). The frit is the then cured or hardened to form an airtight seal between the display portion (101) and the funnel (102). This seal may be referred to as a frit seal (103).

An electron gun (not shown) is then placed at the end of the CRT's "neck" (102). When the CRT is operated, a yoke (not shown) creates an electromagnetic field and causes the stream of electrons emitted from the electron gun to scan in lines across the surface of the display portion (101). Where the stream of electrons hits the electro-luminescent material, the electro-luminescent material emits light. Thus, by rapidly switching the electron stream on and off, or by varying the power of the electron stream as it sweeps across the display portion of the CRT, an image can be formed in the light emitted by the electro-luminescent material. This is the general principle on which CRTs operate.

After the display portion (101) of the tube is joined to the funnel (102) and the joint between the two is sealed with frit, the completed tube is evacuated. Then, the strength of the frit seal (103) and the integrity of the vacuum are evaluated. This evaluation is known as "frit knocking" and is performed by applying a high-voltage to the anode or funnel portion (102) of the CRT.

In the frit knocking process, a conductive band or strap (104) is wrapped around the frit seal (103) and is in physical and electrical contact with the frit seal (103). The conductive band (104) is grounded (105) as shown in FIG. 1. A high-voltage probe (106) is then positioned to apply a voltage to the anode of the CRT. The probe (106) is connected to a voltage source (109) that provides a high voltage output. The tip (107) of the probe is then brought into contact with a point (108) on the anode or funnel portion (102) of the CRT (100).

If there is any flaw in the frit seal (103), such as an opening, a fracture, a gap, etc., the high-voltage probe (106) will create an electrical arc from within the CRT (100), through the flaw in the frit seal (103) and into the grounded band (104). If such arcing is detected, the failure or lack of integrity in the frit seal (103) is also detected. If such arcing is detected, the CRT (100) must be removed from the production line so that the frit seal (103) can be repaired, patched or replaced. Otherwise, the flaw in the existing frit seal may degrade or even disable the performance of the CRT (100).

While this method provides an adequate means of testing or "knocking" the frit seal in a cathode ray tube, there are also significant problems. Specifically, the distance (d) between the tip (107) of the high-voltage probe (106) and the grounded band (104) is small enough that electrical arcing (130) may occur outside the CRT (100) between the probe tip (107) and the grounded band (104).

This arcing (130) poses many problems. For example, the arcing (130) may be detected and attributed to a flaw in the frit seal (103). If this error is not detected, the CRT (100) will not pass the evaluation even though its frit seal (103) may be in perfect condition. Additionally, even if the error is detected, time may be required to reset the testing apparatus that is erroneously registering a flaw in the frit seal (103). External arcing (130) may also damage the equipment being used to evaluate the frit seal (103).

Consequently, in order to more effectively and efficiently test a frit seal (103), the art requires some new means and method of frit knocking that prevents such external arcing between the probe and grounded band

SUMMARY OF THE INVENTION

The present invention meets the above-described needs and others. Specifically, the present invention provides a novel device and method that prevents electrical arcing external to a cathode ray tube that may otherwise occur between a high-voltage probe and a grounded band on the frit seal of the cathode ray tube during testing or "knocking" of the frit seal.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a method of preventing arcing external to a cathode ray tube and between a high-voltage probe and a grounded band disposed around the exterior of a frit seal of the cathode ray tube during evaluation of the frit seal. The method is performed by disposing an insulating member between the high-voltage probe and the grounded band. The insulating member prevents the arcing external to the cathode ray tube between the high-voltage probe and the grounded band.

The method of the present invention may include forming the insulating member as a solid piece of insulating material. Alternatively, in a preferred embodiment, the method is performed by forming the insulating member from a skin of flexible insulating material filled with a second insulating material. The skin on the insulating member may be formed of rubber. The second insulating material is preferably a non-conductive gel.

The method of the present invention may also include forming the insulating member in an oval or spherical shape. Alternatively, the insulating member may be formed with an annular shape. If an annular shape is used, the insulating member may be disposed between the high-voltage probe and the grounded band by extending a tip of the high-voltage probe through the center opening in the annular insulating member.

Preferably, the method of the present invention also includes deforming the flexible skin around a portion of the high-voltage probe and a portion of the cathode ray tube. This helps insure that the insulating member with will prevent, or at least minimize, any arcing external to the cathode ray tube between the high-voltage probe and the ground band on the frit seal.

Finally, the method of the present invention may include applying a voltage to the anode of the cathode ray tube with the high-voltage probe; detecting electrical arcing through the frit seal and into the grounded band; and, if electrical arcing is detected, removing the cathode ray tube from the production line for repair of the frit seal.

The present invention also encompasses the insulating member itself, as well as the methods of making and using the insulating member described above. Stated more specifically, the present invention encompasses an insulating member for preventing arcing external to a cathode ray tube and between a high-voltage probe and a grounded band disposed around the exterior of the frit seal of the cathode ray tube during evaluation of the frit seal of the cathode ray tube. In this case, the insulating member is sized and shaped so as to electrically insulate against the external arcing. The insulating member is also sized and shaped so as to be disposed between the high-voltage probe and the grounded band during the evaluation of the frit seal such that the insulating member prevents the arcing external to the cathode ray tube between the high-voltage probe and the grounded band.

As before, the insulating member may be a solid piece of insulating material or may be a skin of flexible insulating material filled with a second insulating material. In such a case, the skin is preferably formed of rubber and the second insulating material is preferably a non-conductive gel.

The insulating member may have an oval or spherical shape. Alternatively, the insulating member may have an annular shape. If the annular shape is used, the central opening of the annulus is sized and shaped to receive the tip of the high-voltage probe, which extends through the opening when the insulating member is disposed on the probe.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

In general principle, the present invention provides an insulating member used on or with the high-voltage probe. The insulating member is placed between the high-voltage probe tip and the grounded band around the frit seal. Consequently, the insulating member prevents electrical arcing between the high-voltage probe and the grounded band external to the cathode ray tube.

Figure 1:
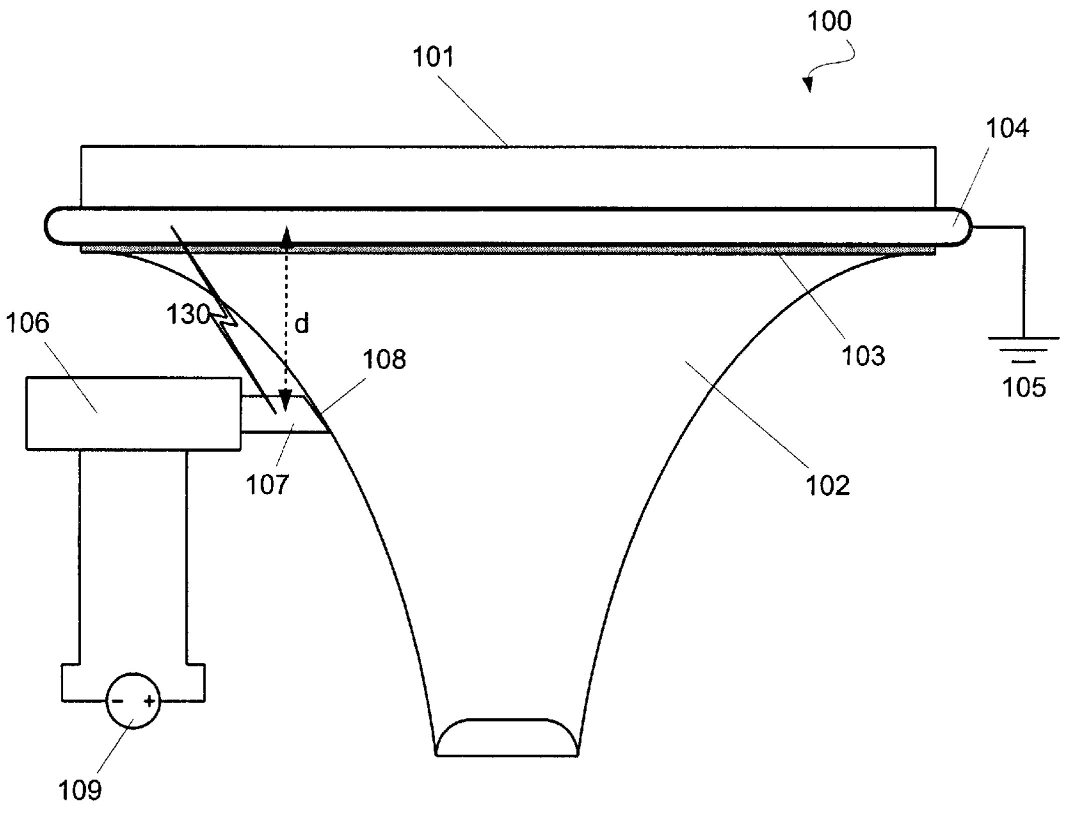
Fig. 1 Prior Art
FIG. 1 is an illustration of a cathode ray tube during a conventional frit knocking procedure in which electrical arcing external to the tube causes problems in the evaluation process.

Using the drawings, the preferred embodiments of the present invention will now be explained. As shown in FIG. 1, and as described above, after the display portion (101) of the tube is joined to the funnel (102) and the joint between the two is sealed with frit, the completed tube is evacuated. Then, the strength of the frit seal (103) and the integrity of the vacuum are evaluated. This evaluation is known as "frit knocking" and is performed by applying a high-voltage to the anode or funnel portion (102) of the CRT.

In the frit knocking process, a conductive band or strap (104) is wrapped around the frit seal (103) and is in physical and electrical contact with the frit seal (103). The conductive band (104) is grounded (105) as shown in FIG. 1. A high-voltage probe (106) is then positioned to apply a voltage to the anode of the CRT. The probe (106) is connected to a voltage source (109) that provides a high voltage output. The tip (107) of the probe is brought into contact with a point (108) on the anode or funnel portion (102) of the CRT (100).

If there is any flaw in the frit seal (103), such as an opening, a fracture, a gap, etc., the high-voltage probe (106) will create an electrical arc from within the CRT (100), through the flaw in the frit seal (103) and into the grounded band (104). If such arcing is detected, the failure or lack of integrity in the frit seal (103) is also detected. If such arcing is detected, the CRT (100) must be removed from the production line so that the frit seal (103) can be repaired, patched or replaced. Otherwise, the flaw in the existing frit seal may degrade or even disable the performance of the CRT (100).

While this method provides an adequate means of testing or "knocking" the frit seal in a cathode ray tube, there are also significant problems. Specifically, as discussed above, the distance (d) between the tip (107) of the high-voltage probe (106) and the grounded band (104) is small enough that electrical arcing (130) may occur outside the CRT (100) between the probe tip (107) and the grounded band (104).

This arcing (130) poses many problems. For example, the arcing (130) may be detected and attributed to a flaw in the frit seal (103). If this error is not detected, the CRT (100) will not pass the evaluation even though its frit seal (103) may be in perfect condition. Additionally, even if the error is detected, time may be required to reset the testing apparatus that is erroneously registering a flaw in the frit seal (103). External arcing (130) may also damage the equipment being used to evaluate the frit seal (103).

Figure 2:
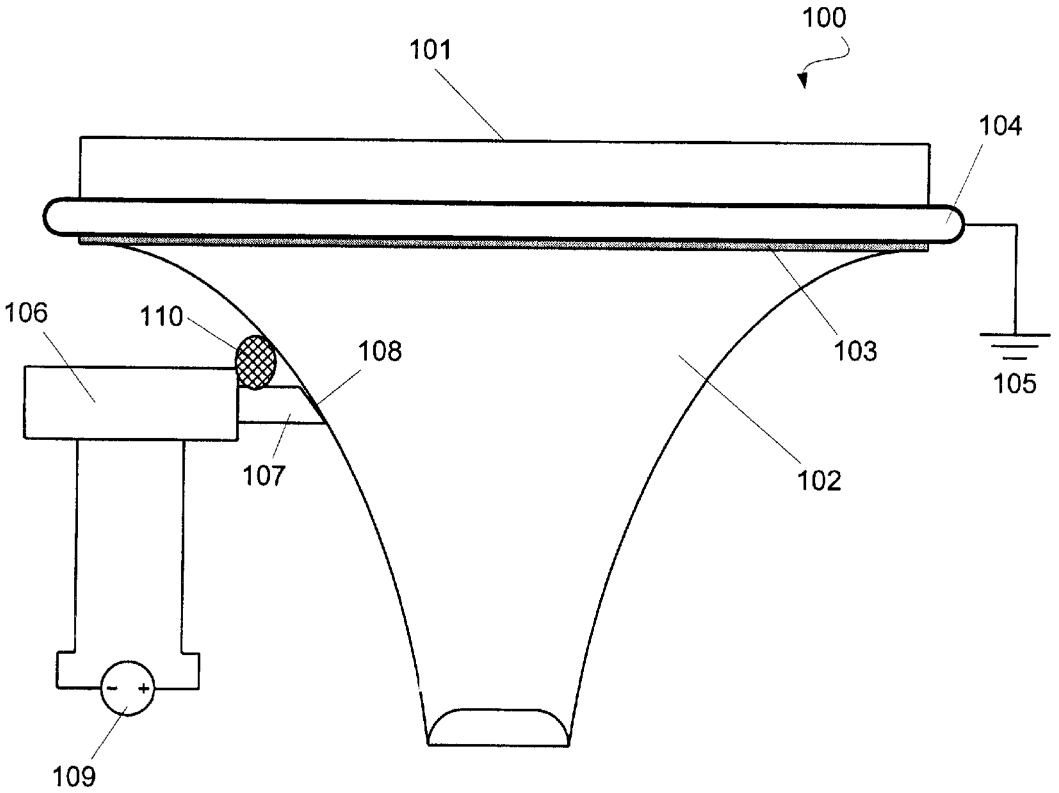
FIG. 2 is an illustration of a first embodiment of an improved frit knocking system according to the principles of the present invention in which external electrical arcing is prevented.

To prevent such external arcing and the problems that result, the present invention provides an insulating member used on or with the high-voltage probe. As shown in FIG. 2, the insulating member (110) is placed between the high-voltage probe tip (107) and the grounded band (104) around the frit seal (103). Consequently, the insulating member (110) prevents electrical arcing between the high-voltage probe (106, 107) and the grounded band (104) where the arcing is external to the cathode ray tube (100).

The insulating member may be made of any insulating material that will preclude or reduce external arcing between the probe tip (107) and the grounded band (104). For example, the insulating member may be a solid piece of rubber or some other insulating material. However, the insulating member (110) is preferably a pack of non-conductive rubber filled with another non-conductive or insulating material.

The insulating member may have any shape calculated to block arcing between the probe tip (107) and the grounded band (104). However, the member (110) preferably has an oval or spherical shape as shown in FIG. 2.

If the insulating member (110) is made of a non-conductive rubber skin filled with an insulating gel, the surface of the member (110) will be flexible such that the member (110) can conform to the shape of the probe tip (107) and the side of the funnel (102). This will help insure that no arcing occurs around the insulating member (110).

Figure 3:
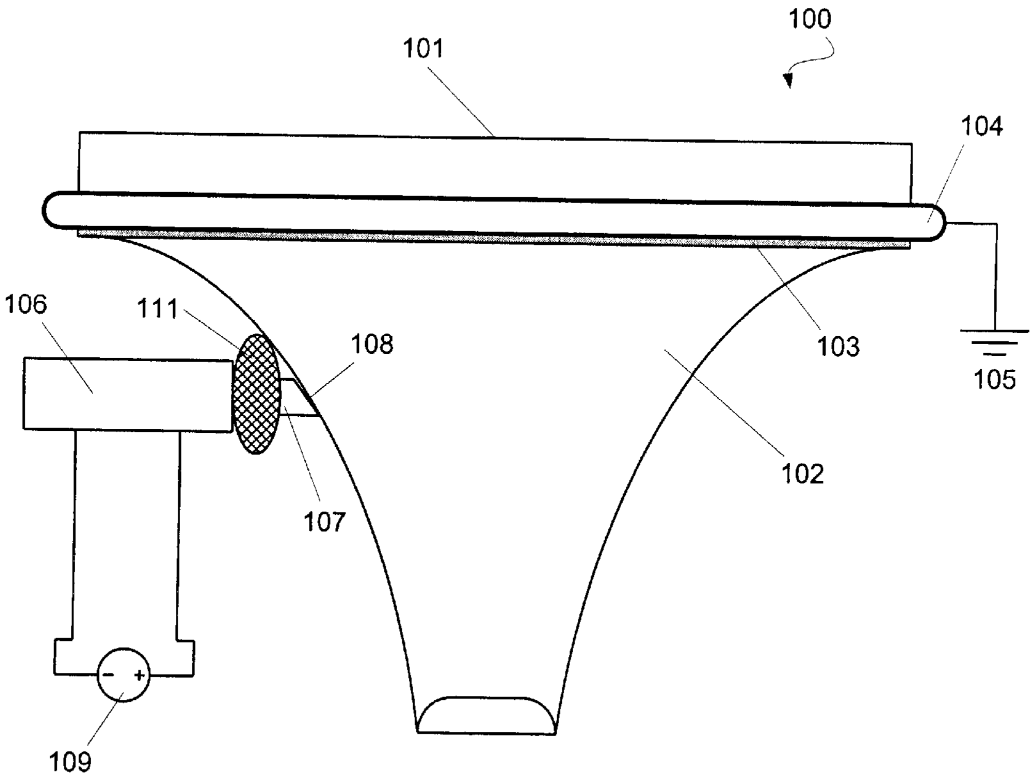
FIG. 3 is an illustration of a second embodiment of an improved frit knocking system according to the principles of the present invention in which external electrical arcing is prevented.

Alternatively, as shown in FIG. 3, the insulating member (111) of the present invention may be formed with an annular shape. In such a case, the insulating member can be disposed on the tip (107) of the high-voltage probe (106). The tip (107) of the probe (106) extends through the center of the annular insulating member (111). In this way, the probe tip (107) supports the insulating member (111), while the member (111) is also properly positioned to prevent or reduce electrical arcing exterior to the CRT (100) between the probe tip (107) and the grounded band (104).

As before, the insulating member (111) may be a solid annulus of rubber or some other insulating material. Alternatively, the insulating member (111) is preferably made of a non-conductive, hollow rubber annulus filled with a non-conductive or insulating material, preferably a gel. If the insulating member (111) is so constructed of a non-conductive rubber skin filled with an insulating gel, the surface of the member (111) will be flexible such that the member (111) can conform to the shape of the probe tip (107) and the side of the funnel (102). This will help insure that no arcing occurs around the insulating member (111).

Figure 4A:
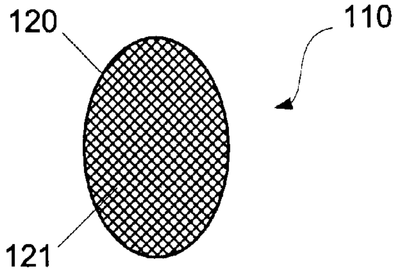
FIGS. 4*a* and 4*b* are detailed illustrations of the insulating members used in the systems of FIGS. 2 and 3, respectively, under the principles of the present invention.

FIG. 4*a* illustrates in more detail the oval or spherical insulating member (110) as illustrated and described above in FIG. 2. In this preferred embodiment, the insulating member (110) is a package with a non-conductive flexible skin (120) that is preferably made of rubber. The skin (120) is filled with a non-conductive or insulating material (121), preferably a gel.

If the insulating member (110) is made of a non-conductive rubber skin (120) filled with an insulating gel (121), the surface (120) of the member (110) will be flexible such that the member (110) can conform to the shape of the probe tip and the side of the funnel. This will help insure that no arcing occurs around the insulating member (110).

Figure 4B:
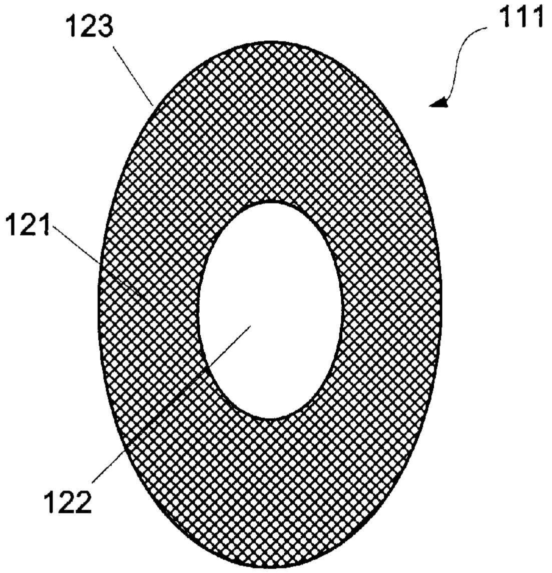

FIG. 4*b* illustrates in more detail the annular insulating member (111) as illustrated and described above in FIG. 3. In this preferred embodiment, the insulating member (110) is a hollow annulus composed of a non-conductive flexible skin (123). Preferably, the skin (123) is made of rubber. The skin (123) is filled with a non-conductive or insulating material (121), preferably a gel.

An opening or hole (122) passes through the center of the annular member (111). The tip of the high-voltage probe is inserted through the opening (122) to dispose the insulating member (111) on the probe.

If the insulating member (111) is made of a non-conductive, annular rubber skin (123) filled with an insulating gel (121), the surface (123) of the member (111) will be flexible such that the member (111) can conform to the shape of the probe tip and the side of the funnel of the CRT. This will help insure that no arcing occurs around the insulating member (111).

Figure 5:
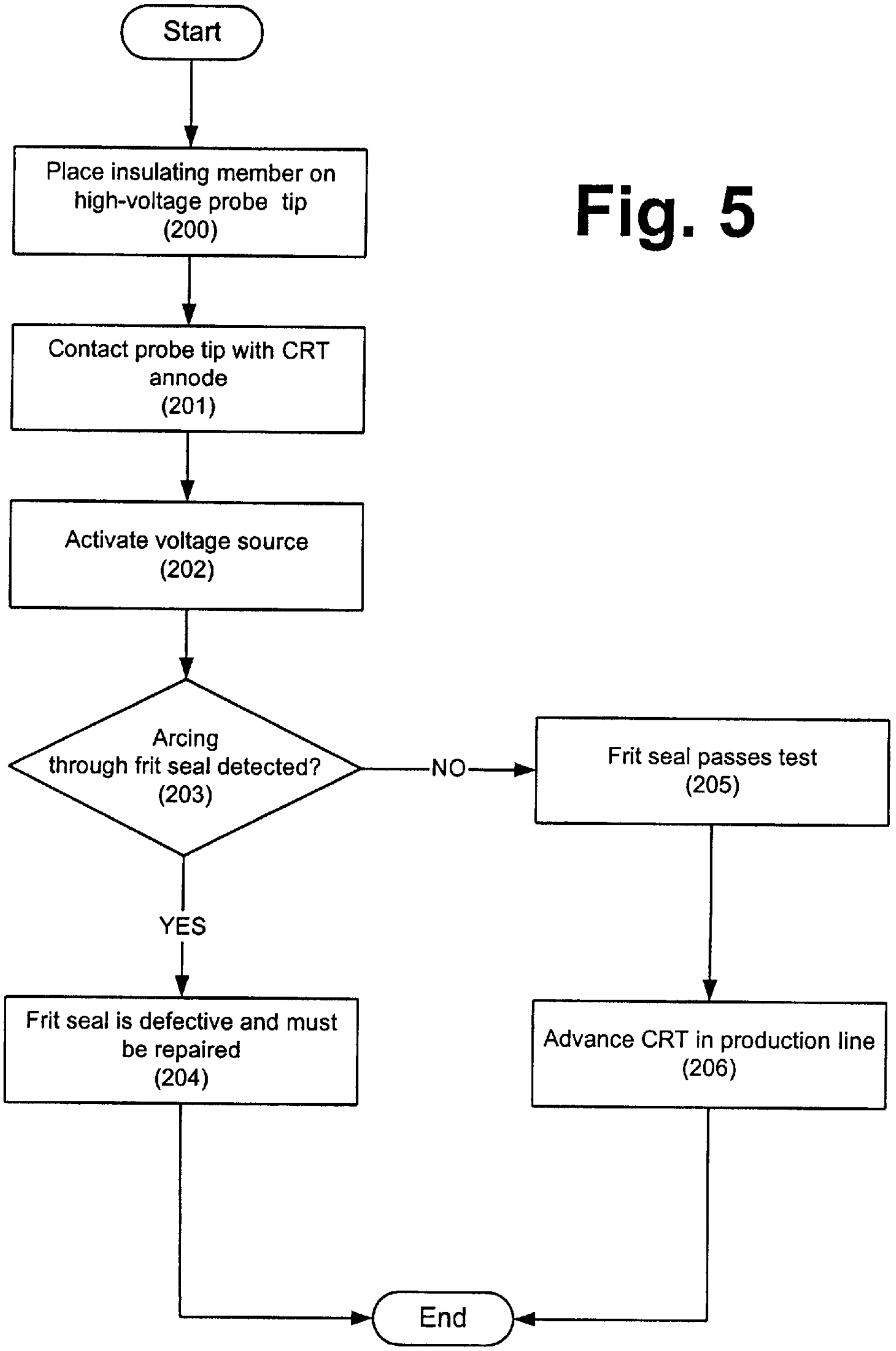
FIG. 5 is a flow chart illustrating the improved frit knocking method of the present invention.

FIG. 5 is a flow chart illustrating the method of the present invention. As shown in FIG. 5, an insulating member is placed on the tip of a high voltage probe (200). The insulating member is positioned so as to be between the tip of the probe and the grounded band around the frit seal when the probe tip is positioned to apply a voltage to the anode or funnel of the CRT. The insulating member may be the member described in FIG. 2, FIG. 3 or some other insulating member.

Next, the probe tip is brought into contact with the anode of the CRT (201). The voltage source connected to the probe is then activated (202) to apply a high voltage. The CRT is then monitored for electrical arcing that occurs through the frit seal and into the grounded band around the exterior of the frit seal (203). With the insulating member in place between the probe tip and the grounded band, exterior arcing is precluded and is of almost no concern.

If arcing is detected, the arcing is presumed to occur through flaws in the frit seal. The frit seal is accordingly determined to be defective and must be repaired or replaced (204).

If, alternatively, arcing is not detected, the frit seal is considered to be sound (205). The CRT can then be advanced along the production line (206).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of preventing arcing external to a cathode ray tube and between a high-voltage probe and a grounded band disposed around an exterior of a frit seal of the cathode ray tube during evaluation of said frit seal of said cathode ray tube, said method comprising:

disposing an insulating member between said high-voltage probe and said grounded band, said insulating member preventing said arcing external to said cathode ray tube between said high-voltage probe and said grounded band; and forming said insulating member from a skin of flexible insulating material filled with a second insulating material;

wherein said second insulating material is a non-conductive gel.

2. The method of claim 1, wherein forming said skin on said insulating member comprises forming said skin of rubber.

3. The method of claim 1, wherein said forming said insulating member further comprises forming said skin of flexible insulating material in an oval or spherical shape.

4. The method of claim 1, wherein said forming said insulating member further comprises forming said skin of flexible insulating material in an annular shape.

5. The method of claim 4, wherein said disposing said insulating member between said high-voltage probe and said grounded band further comprises extending a tip of said high-voltage probe through a center opening in said annular insulating member.

6. The method of claim 1, further comprising deforming said flexible skin around a portion of said high-voltage probe and a portion of said cathode ray tube.

7. The method of claim 1, further comprising:

applying a voltage to an anode of said cathode ray tube with said high-voltage probe;

detecting electrical arcing through said frit seal and into said grounded band; and, if said electrical arcing is detected, removing said cathode ray tube from a production line for repair of said frit seal.

8. A system for preventing arcing external to a cathode ray tube and between a high-voltage probe and a grounded band disposed around an exterior of a frit seal of the cathode ray tube during evaluation of said frit seal of said cathode ray tube, said system comprising:

insulating means for electrically insulating against said external arcing; and means for disposing said insulating means between said high-voltage probe and said grounded band, wherein said insulating means prevent said arcing external to said cathode ray tube between said high-voltage probe and said grounded band;

wherein said insulating means comprises a skin of flexible insulating material filled with a second insulating material; and wherein said second insulating material is a non-conductive gel.

9. The system of claim 8, wherein skin is formed of rubber.

10. The system of claim 8, wherein said insulating means has oval or spherical shape.

11. The system of claim 8, wherein said insulating means has an annular shape.

12. The system of claim 11, wherein said means for disposing said insulating member between said high-voltage probe and said grounded band comprises a central opening in said annular insulating means through which a tip of said high-voltage probe is extended.

13. The system of claim 8, wherein said means for disposing said insulating member between said high-voltage probe and said grounded band comprises deformation said flexible skin around a portion of said high-voltage probe and a portion of said cathode ray tube.

14. The system of claim 8, further comprising:

means for applying a voltage to an anode of said cathode ray tube with said high-voltage probe; and means for detecting electrical arcing through said frit seal and into said grounded band;

wherein, if said electrical arcing is detected, said cathode ray tube is removed from a production line for repair of said frit seal.

15. An insulating member for preventing arcing external to a cathode ray tube and between a high-voltage probe and a grounded band disposed around an exterior of a frit seal of the cathode ray tube during evaluation of said frit seal of said cathode ray tube, wherein:

said insulating member is sized and shaped so as to electrically insulate against said external arcing;

said insulating member is sized and shaped so as to be disposed between said high-voltage probe and said grounded band during said evaluation of said frit seal; and said insulating member prevents said arcing external to said cathode ray tube between said high-voltage probe and said grounded band;

wherein said insulating member comprises a skin of flexible insulating material filled with a second insulating material; and wherein said second insulating material is a non-conductive gel.

16. The insulating member of claim 15, wherein skin is formed of rubber.

17. The insulating member of claim 15, wherein said insulating member has oval or spherical shape.

18. The insulating member of claim 15, wherein said insulating member has an annular shape.

19. The insulating member of claim 18, wherein said annular insulating member comprises a central opening through which a tip of said high-voltage probe is extended.

20. The insulating member of claim 15, wherein said flexible skin is deformed around a portion of said high-voltage probe and a portion of said cathode ray tube.

* * * * *